Patented Oct. 31, 1933

1,933,052

UNITED STATES PATENT OFFICE 1,933,052

PRODUCTION OF POLYMERIZATION PRODUCTS

Hans Fikentscher, Ludwigshafen-on-the-Rhine, and Walter Wolff, Mannheim, Germany, assignors to I. G. Farbenindustrie Aktiengesellschaft, Frankfort-on-the-Main, Germany No Drawing. Application May 19, 1931, Serial No. 538,608, and in Germany May 26, 1930

15 Claims. (Cl. 260—2)

The present invention relates to the production of polymerization products.

We have found that particularly valuable polymerization products are obtained by polymerizing at least one acrylic compound, free from salt groups, i. e. acrylic acid or its derivatives, free from salt groups, and homologous compounds of acrylic acid or their derivatives, in admixture with one or more polymerizable vinyl compounds, such as styrenes, as for example styrene, methyl- or chloro-styrenes, and vinyl chloride or vinyl acetate, in the usual manner, preferably with an addition of peroxidic polymerization accelerators, as for example hydrogen peroxide, benzoyl peroxide or acetone peroxide. Acrylic salts cannot be employed since they do not give the desired products.

As derivatives of acrylic acid may be mentioned, for example, acrylic nitrile, acrylic amides, such as acrylic anilide or cyclohexylamide, acrylic halides and the esters of acrylic acid with mono- or polyhydric alcohols or their substitution products, such as ethylene glycol mono-ethyl ether, glycol chlorhydrin, esters of polyhydric alcohols having at least one free hydroxyl group and like derivatives of polyhydric alcohols containing at least one free hydroxyl group. As homologous compounds may be mentioned the alpha- or beta-alkyl and aryl compounds of acrylic acid and their derivatives, as for example alpha-methyl acrylic acid and the like. The properties of the products may be varied within wide limits by altering the nature, number and amount of the single components as desired. In most cases the acrylic compounds and the other vinyl compounds are employed in about equimolecular proportions, good products being also obtained by employing mixtures containing from about 20 to about 80, or preferably 25 to 75, per cent of either of the said components. In many cases it is advantageous to add solvents, such as ethyl alcohol, acetone, benzene, butyl acetate or like organic solvents; mixed polymerization products are then obtained the solutions of which show a lower viscosity than those prepared without the addition of solvents and thus allow of producing solutions of a higher concentration without increase of viscosity.

A small addition, say about 0.5 per cent of the polymerizable substances, of anhydrides of organic acids, as for example of acetic anhydride, usually accelerates the polymerization, which is usually carried out near, or preferably at, the boiling point of the reaction mixture.

By the addition of softeners and/or resins the physical and especially the mechanical properties of the final products may be varied in a large degree. By the addition of softeners, such as di-butyl phthalate or tri-phenyl phosphate soft products are obtained, whereas an addition of resins, such as a condensation product from p-toluene sulphamide and formaldehyde improves the adhesive properties of the products especially if the latter are intended for coating purposes. An addition of water insoluble cellulose derivatives, such as cellulose acetate, increases the mechanical strength of the products. Fillers, such as chalk, barium sulphate and the like, color pigments, such as iron oxide, or soluble dyestuffs, as for example amino-anthraquinones, and other additions may be incorporated before the polymerization or with the spinning, film and lacquer solutions as desired.

The final mixed polymerization products are insoluble in water, some being soluble in alkaline aqueous solutions, and differ completely from those of the pure components as regards their properties. For example pure polymerized acrylic nitrile is as good as insoluble in all organic solvents while the mixed polymerization product from acrylic nitrile and 60 per cent or more of vinyl acetate is soluble in acetone to give a clear solution. Furthermore, while polymerized styrene is completely insoluble in water and aqueous alkaline solutions, the product obtained by polymerizing a mixture of 60 per cent of acrylic acid and 40 per cent of styrene is readily soluble in aqueous alkaline solutions thus resembling shellac in its properties. It must be assumed therefore that not only a polymerization but also an addition or condensation takes place.

Threads, films, coatings, priming compositions and the like can be prepared from the water-insoluble products according to the present invention.

The soluble esters of acrylic acid and polymerized alone or in admixture with each other usually form soft rubber-like skins which are not suitable as such for the preparation of useful threads and films. If, however, before the polymerization, the esters be mixed with vinyl compounds, as for example vinyl chloride, vinyl acetate or styrene, products are obtained which yield threads, films, coatings and the like having a different elasticity and hardness depending on the selection and the number of the components and the proportions employed.

The threads prepared in the usual manner from solutions of such polymerization products may be spun or woven alone or together with other threads and by reason of their different tinctorial behaviour from natural fibres they are suitable as effect threads in fabrics from natural fibres.

The films prepared in the usual manner, for example by pouring or spraying, may be employed, depending on their nature, for all those purposes for which films from cellulose and its derivatives have hitherto been employed, as for example as transparent protective coverings for food and useful articles of all kinds, as intermediate sheets between printed pages, as substrata for emulsions for photographic purposes and in part as intermediate layers for sticking together metals, wood, leather, and similar materials.

Especially valuable lacquer coatings are obtained by employing several layers which are adapted in their properties to the requirements of the single layers. Thus it is preferable, for example, on very smooth surfaces first to apply a thin coating of pure polymerized acrylic ester which adheres extremely firmly to the substratum, then to apply an elastic intermediate layer of a mixed polymerization product containing from 40 per cent of vinyl chloride and from 60 per cent of acrylic methyl ester and finally to apply to the surface layer a film of hard mixed polymerization product containing 60 per cent of acrylic nitrile and 40 per cent of acrylic methyl ester. Furthermore individual layers may be replaced by the usual oil varnish or cellulose lacquer layers.

The following examples will further illustrate the nature of this invention but the invention is not restricted to these examples. The parts are by weight.

Example 1

0.3 part of benzoyl peroxide is added to an anhydrous mixture of 50 parts of monomeric acrylic acid and 50 parts of monomeric vinyl acetate and the whole is introduced gradually into a vessel heated to 90° C. and provided with a reflux condenser. At about 75° C. polymerization sets in and the temperature is finally raised to 90° C. The polymerization product is from colorless to slightly yellow and is soluble in acetone.

Example 2

50 parts of monomeric acrylic ethyl ester and 43 parts of vinyl acetate are mixed and 0.3 part of benzoyl peroxide is added. The mixture is allowed to flow gradually into a vessel heated to from 85° to 95° C. and provided with a reflux condenser as described in Example 1. A practically clear, highly elastic product is obtained, which may be homogeneously mixed with nitrocellulose in any desired proportion.

Example 3

A mixture of 50 parts of acrylic ethyl ester together with 5 parts of methylene chloride and 50 parts of vinyl chloride is exposed in a closed glass vessel to the action of sunlight for several hours. The mixed polymerization product obtained is a very tough, pliable mass soluble in methylene chloride. A polymerization product which is hard when cold and is soluble in acetone and other organic solvents is obtained.

Example 4

60 parts of styrene are dissolved in 40 parts of acrylic ethyl ester and 0.5 part of benzoyl peroxide is added to the solution. The solution is then allowed to drop into a vessel heated to 90° C. and provided with a reflux condenser as the polymerization proceeds and the whole is finally heated for 3 hours at 95° C. A transparent pale yellow polymerization product is obtained which is substantially more elastic than pure polymerized styrene. It is soluble in organic solvents, such as benzene, acetone and butyl acetate.

Example 5

50 parts of an aqueous solution containing about 36 parts of acrylic acid are vigorously shaken with 50 parts of styrene and 2 parts of 30 per cent hydrogen peroxide. About 25 parts of the acrylic acid dissolve in the styrene the remaining 11 parts of acrylic acid remaining in the water. The aqueous solution is removed and the mixture of styrene and acrylic acid is allowed to drop into a vessel heated to 90° C. and provided with a reflux condenser at the rate at which the polymerization proceeds. A colorless elastic product is obtained which is soluble in dilute alkalies giving very viscous solutions.

Example 6

50 parts of acrylic nitrile, 40 parts of acrylic ethyl ester and 10 parts of styrene are mixed with 0.5 part of acetic anhydride and 0.3 part of benzoyl peroxide. This mixture is allowed to flow a little at a time into a vessel heated to about 77° C. and provided with a reflux condenser. After raising the temperature as described in the foregoing examples a thermoplastic polymerization product is obtained which dissolves in acetone giving very viscous clear solutions and may be employed as a substitute for nitrocellulose in the production of coating and insulating preparations or of artificial masses from the solutions.

Example 7

0.3 part of benzoyl peroxide is dissolved in a mixture of 30 parts of acrylic nitrile, 30 parts of styrene, 20 parts of acrylic methyl ester and 20 parts of acrylic acid. The mixture is allowed to flow at the rate at which the polymerization proceeds into a vessel heated to 90° C. and provided with a reflux condenser. After finally heating to 120° C. a thermoplastic product is obtained which may be pressed into artificial masses of great mechanical strength.

Example 8

5 parts of cellulose benzyl ether and 0.3 part of benzoyl peroxide are dissolved in 40 parts of acrylic methyl ester and 50 parts of styrene. The mixture is polymerized by causing it to flow into a vessel heated to 80° C. and provided with a reflux condenser, and, after final heating to 135° C., a very elastic solid mass is obtained, which is soluble in benzene and may be employed for coating purposes.

Example 9

70 parts of styrene, 30 parts of acrylic n-butyl ester and 0.3 part of benzoyl peroxide are mixed with 100 parts of toluene and refluxed until a viscous solution is obtained. The solution of the polymerization product obtained may be directly employed for coating purposes or for the preparation of lacquers.

Example 10

A mixture of 30 parts of acrylic methyl ester, 60 parts of vinyl chloride and 10 parts of a resin from the condensation of p-toluene sulphamide with formaldehyde is mixed with 0.5 part of benzoyl peroxide and heated in an autoclave to 60° C. A thermoplastic product is obtained, which when dissolved in methylene chloride or acetone furnishes clear transparent films or coatings.

What we claim is:

1. In the production of polymerization products, the step which comprises polymerizing a mixture of at least one aliphatic acrylic compound, free from salt groups, with another polymerizable mono-vinyl compound.

2. In the production of polymerization products with the aid of peroxidic polymerization accelerators, the step which comprises polymerizing a mixture of an aliphatic acrylic compound, free from salt groups, with another polymerizable mono-vinyl compound.

3. In the production of polymerization products, the step which comprises polymerizing a mixture of an aliphatic acrylic compound, free from salt groups, with a styrene.

4. In the production of polymerization products, the step which comprises polymerizing a mixture of an aliphatic acrylic compound with a polymerizable ester of vinyl alcohol.

5. As new articles of manufacture, water-insoluble polymerization products comprising at least one polymeric aliphatic acrylic compound, free from salt groups, inter-polymerized with at least one other polymeric mono-vinyl compound.

6. As new articles of manufacture, water-insoluble polymerization products comprising a polymeric aliphatic acrylic compound, free from salt groups, inter-polymerized with at least an equimolecular quantity of another polymeric mono-vinyl compound.

7. As new articles of manufacture, water-insoluble polymerization products comprising a polymeric aliphatic acrylic compound, free from salt groups, inter-polymerized with a polymeric styrene.

8. As new articles of manufacture, water-insoluble polymerization products comprising a polymeric aliphatic acrylic compound, free from salt groups, inter-polymerized with at least an equimolecular quantity of a polymeric styrene.

9. As new articles of manufacture, water-insoluble polymerization products comprising a polymeric aliphatic acrylic compound, free from salt groups, inter-polymerized with a polymeric ester of vinyl alcohol.

10. As new articles of manufacture, water-insoluble polymerization products comprising a polymeric aliphatic acrylic compound, free from salt groups, inter-polymerized with at least an equimolecular quantity of a polymeric ester of vinyl alcohol.

11. As new articles of manufacture, water-insoluble polymerization products comprising a polymeric aliphatic acrylic ester inter-polymerized with from about 100 to about 150 per cent thereof of another polymeric mono-vinyl compound, selected from the group consisting of vinyl chloride and styrene.

12. As new articles of manufacture, water-insoluble polymerization products comprising a polymeric aliphatic acrylic acid inter-polymerized with from about 100 to about 150 per cent thereof of another polymeric mono-vinyl compound, selected from the group consisting of vinyl chloride and styrene.

13. As new articles of manufacture, water-insoluble polymerization products comprising a polymeric acrylic nitrile, inter-polymerized with another polymeric mono-vinyl compound, selected from the group consisting of vinyl chloride and styrene, and a softener.

14. As new articles of manufacture, water-insoluble polymerization products comprising a polymeric aliphatic acrylic compound, free from salt groups, inter-polymerized with a preponderating quantity of another polymeric mono-vinyl compound, selected from the group consisting of vinyl chloride and styrene.

15. As new articles of manufacture, water-insoluble polymerization products comprising an inter-polymerized mixture of a polymeric mono-vinyl compound, selected from the group consisting of vinyl chloride and styrene, and up to 30 per cent by weight of said vinyl mixture of a polymeric aliphatic acrylic ester.

HANS FIKENTSCHER.
WALTER WOLFF.